Patented July 13, 1954

2,683,343

UNITED STATES PATENT OFFICE 2,683,343

TUMBLING PROCESS

Charles R. Gillette and William P. Burroughs, Bristol, Conn., assignors to General Motors Corporation, Detroit, Mich., a corporation of Delaware No Drawing. Application November 15, 1952, Serial No. 320,837

10 Claims. (Cl. 51—282)

This invention relates to a process for improving bearing operation, and particularly to a tumbling process for antifriction bearings whereby the fit of the rolling elements with the bearing raceways and with the bearing cage or separator is improved to reduce both the starting torque and the running torque of the bearings.

Many applications of delicate jewelled bearings in precision instruments are now being supplanted with more rugged antifriction bearings such as very small ball bearings. A large percentage of these tiny antifriction bearings even when manufactured within extremely close tolerances and carefully assembled, often have to be discarded since a slightly improper fit of parts, minor raceway imperfections or the presence of tiny particles of dirt or smut in the bearing produces too great a starting and too great a running torque for such a bearing. Even with bearing parts all produced within the required very close limits of size, cumulative errors occasionally occur which make some of these small bearings unacceptable. One procedure for reducing the starting and running friction in these small bearings and for making more of them acceptable has been to slowly tumble the assembled bearings over each other for about 100 hours in aqueous solutions containing soap, very finely divided abrasive and potassium cyanide. However, this tumbling process has often been found objectionable and unsatisfactory since it frequently deposits deleterious material in the form of smut, dirt and metal oxides which adhere tenaciously to the bearing races and other bearing parts thereby impeding the free movement of the rolling elements and occasionally making the operation of these tiny precision bearings worse than it was prior to this treatment. Another serious objection to this treatment lies in the fact that it is hazardous to employ potassium cyanide which is a virulent poison. Furthermore, potassium cyanide as used in this solution is unstable and frequently breaks down resulting in the deposit of metal oxides and smut which are difficult to remove from the bearing parts.

It is, therefore, an object of this invention to provide an improved and reliable bearing tumbling process which will improve and clean the operative bearing surfaces.

Another object is to provide an improved tumbling process for bearing assemblies wherein the interfitted relation of the bearing parts is improved and the operating torques of the bearings are reduced.

A further object resides in the provision of a process for improving the interfitted relation of bearing parts wherein a chelating agent is used during a tumbling operation to remove metal oxides and smut that frequently adhere to the bearing surfaces.

A still further object resides in the provision of an improved tumbling process for simultaneously cleaning and reducing the starting torque of assembled bearings wherein a finely divided abrasive is employed in conjunction with a chelating agent in a tumbling solution.

To these ends and also to improve generally upon processes of this character, this invention consists in the various matters hereinafter described and claimed. In its broader aspects, the invention is not necessarily limited to the specific examples hereinafter set forth for purposes of illustration.

This objectionable smut, which has been difficult to remove from bearings, has frequently been deposited out of suspension in prior types of tumbling solutions and into tenacious adhesion with bearing surfaces. To overcome the objectionable features of previous tumbling processes, which frequently failed to leave the bearing surfaces clean, the present invention employs in a tumbling solution, a chelating agent that removes from the bearings the smut which firmly adheres to the bearings due to the presence of metal oxide as iron oxide and heavy metal soaps. This chelating agent forms soluble complex compounds with the metal ions present so that the smut cannot be deposited on the bearing surfaces during tumbling. In fact, this improved tumbling process has been effectively used to reclaim bearings containing smut that has been deposited by a prior tumbling process which used potassium cyanide. One satisfactory chelating agent successfully employed for this purpose, comprises a material containing a tetra sodium salt of ethylene diamine tetra acetic acid known under the trade name of "Versene." Other chelating agents which are stable in solution and which have strong complexing power with metal ions to produce stable soluble compounds, can also be used in the same manner. A very finely comminuted abrasive powder is also employed in the tumbling solution to coact with a detergent and a surface active agent in loosening the dirt and smut from the bearing surfaces and to remove immeasurably minute portions of the bearing surfaces for reducing the starting and running torques of assembled bearings during this tumbling operation. Subsequent steps of washing and rinsing remove all traces of abrasive and detergent from the bearings leaving them spotlessly clean with their operative surfaces free from contamination even when examined under high magnification.

In one form of this improved tumbling process, all lubricant is first removed from the assembly bearings by agitating them in a cleaning solution containing toluene, Stoddard solvent and butyl alcohol.

When these assembled bearings are free of lubricant, they are slowly tumbled over each other for at least 24 hours in the following solution:

| | | |
|---|---|---|
| Distilled water | gallons | 1 |
| "Versene" T | cc | 378.5 |
| Fatty alcohol sulphate ("Orvus") | grams | 2 |
| "Flaxoap" | do | 80 |
| "Gamal" (20% suspension of finely powdered alumina) | grams | 150 |

To the above solution containing 10% Versene, a suitable alkali, as sodium hydroxide, is added in sufficient quantity to bring the pH of the tumbling solution to a point at which the chelating agent is efficiently active. In the above solution, a pH of 12 is satisfactory.

This tumbling process is not critical as to temperature and is preferably performed at normal room temperatures in closed non-metallic containers partially filled with the assembled bearings and substantially completely filled with the tumbling solution. These containers are slowly rotated or gyrated about changing axes causing the assembled bearings to slowly tumble over each other while the tumbling solution washes back and forth between the bearing parts causing a vigorous cleaning action combined with a very mild abrading action.

Other detergents than "Flaxoap" (which is derived from vegetable oils) may be employed, but when the detergent is a soap it preferably should be free from fatty acid and should also be completely saponified. Other abrasives than alumina can also be used, but the abrasive should be very carefully graded and of sufficient fineness to remain in suspension in the tumbling solution. Also, the abrasive should be of such character that as it is washed back and forth against the bearings it will mechanically break down and continue to present minute sharp cutting edges. This process is not limited to the use of a fatty alcohol sulphate since other surface active agents can be used in the tumbling solutions to facilitate wetting of the bearing surfaces with the tumbling solutions even if all traces of lubricant have not been previously removed from the bearings.

The tumbling solution is next drained off and the bearings are thoroughly rinsed in acid-free running water after which they are again tumbled generally as before in the following solution for a minimum of 24 hours:

| | | |
|---|---|---|
| Distilled water | gallons | 1 |
| "Flaxoap" | grams | 100 |
| "Versene" T | cc | 378.5 |
| Suitable alkali in sufficient quantity to make the "Versene" T efficiently active. | | |

This last tumbling action in the above solution washes the bearings free of abrasive and leaves the bearing surfaces with a high luster.

This second tumbling solution is drained off and the bearings are again thoroughly rinsed in acid-free running water after which the bearings are tumbled generally as before but for approximately two hours in the following solution which removes all of the detergent from the bearings:

| | | |
|---|---|---|
| Distilled water | gallons | 1 |
| "Versene" T | cc | 378.5 |
| "Orvus" | grams | 1.8 |

One half of this last tumbling solution is poured off and replaced with the same volume of distilled water after which the bearings are again tumbled in this diluted solution for about one half hour followed by draining off of this solution and then subjecting the bearings to three separate twenty second rinses in distilled water followed by immediate drying of the bearings under hot air blast in a dust free atmosphere.

The dry assembled bearings are next rinsed in a suitable oil preferably at a temperature above 200° F. and immediately stored in vials or the like containing a suitable lubricating oil.

Another form of this tumbling process is carried out generally as above described except for the following differences:

The first tumbling solution contains a much lesser amount, for example 1% instead of 10% of the chelating agent previously used, and four hours of tumbling in this first solution is usually sufficient. This first tumbling solution with the lesser content of chelating agent provides the necessary cleaning action as well as sufficient abrading action to remove the minor bearing fit imperfections while preventing any substantial deposition of smut. It has been found that the more dilute solution of this chelating agent has much less tendency to dissolve small quantities of alumina while this chelating agent still has a strong affinity for iron ions and hence avoids the breaking down and dulling of the tiny abrasive edges on the finely divided abrasive particles carried in suspension. Depending upon the size of these tiny abrasive cutting edges as well as the type of abrasive, up to 2% of this chelating agent may be used in this first tumbling solution. However, the amount of chelating agent should be just small enough so that it will not dull the cutting edges on the abrasive particles in suspension. Any smut, dirt, or other deleterious matter which may not have been completely removed by this first tumbling operation is subsequently removed by the second tumbling operation which is the same as previously described and contains preferably 10% by volume of the chelating agent, the second tumbling operation being carried out for at least eight hours. However, it has been found that at least 5% by volume of this chelating agent should be present. The subsequent rinsing, tumbling and drying operations may be the same as before.

This improved tumbling process provides a simple and effective mass production method for reducing the starting and running torque of anti-friction bearings to a long desired minimum which makes these bearings of such consistently low inherent friction that they are highly satisfactory even as gimbal bearings needed for pivotally supporting the very freely rotatable shafts in precision aircraft instruments. Substantially all bearings subjected to this tumbling process pass the exacting test for extremely low starting and running torque; and the very few bearings which are unacceptable are usually found to pass this test after further tumbling treatment in accordance with this process.

We claim:

1. A tumbling process for treating bearings comprising the steps of removing lubricant from the bearings with a solvent, and subjecting the bearings to a tumbling operation in a detergent solution containing a stable chelating agent which chemically combines with ferrous metal ions present in material adhering to the bearings and forms with these ions stable compounds which enter into and remain in solution.

2. A tumbling process for treating bearings comprising the steps of removing lubricant from the bearings with a solvent, and tumbling the bearings in a solution containing a detergent, finely divided abrasive in suspension and a stable chelating agent which chemically combines with ferrous metal ions present in material adhering to the bearings and which forms with these ions stable compounds that enter into and remain in solution during the entire tumbling operation.

3. A tumbling process for bearings comprising the steps of removing lubricant from the bearings with a solvent; tumbling the bearings for at least 24 hours in an aqueous alkaline solution having a pH within the range of 12 to 14 and containing a detergent, a surface active agent, finely divided abrasive in suspension, and a stable chelating agent which has chemical affinity for and forms a stable soluble compound with ferrous metal ions present in smut and other deleterious coatings adhering to the bearings; and washing the tumbling solution from the bearings.

4. A tumbling process for bearings comprising the steps of removing lubricant from the bearings with a solvent, tumbling the bearings in an aqueous solution having a pH within the range of 12 to 14 and containing a detergent, a surface active agent, an abrasive in suspension and a stable chelating agent that chemically unites with ferrous metal ions present in smut and dirt deposits on the bearings to form stable compounds that enter into and remain in solution; washing the tumbling solution from the bearings; tumbling the bearings in an aqueous solution containing a detergent and a stable chelating agent that chemically unites with and holds ferrous metal ions in solution; rinsing the bearings in water; drying the bearings; and rinsing the bearings in suitable lubricant.

5. A tumbling process for bearings comprising the steps of removing lubricant from the bearings with a solvent; tumbling the bearings in a detergent solution having a pH within the range of 12 to 14 and containing finely divided abrasive in suspension and a stable chelating agent which chemically unites with ferrous metal ions and forms stable soluble compounds, the amount of chelating agent present being insufficient to dull the tiny sharp edges of the finely divided abrasive but being sufficient to remove ferrous metal ions from coatings of smut and dirt on the bearings; washing the bearings, tumbling the bearings in a detergent solution containing a much stronger concentration of said chelating agent than used in the first tumbling solution; and washing and drying the bearings.

6. A tumbling process for bearings comprising the steps of removing lubricant from the bearings with a solvent, and subjecting the bearings to a tumbling operation in a detergent solution having a pH within the range of 12 to 14 and containing a stable chelating agent that has a strong affinity for ferrous metal ions, this chelating agent largely comprising a tetra sodium salt of ethylene diamine tetra acetic acid.

7. A tumbling process for bearings comprising the steps of removing lubricant from the bearings with a solvent; and subjecting the bearings to a tumbling operation in a solution having a pH within the range of 12 to 14 and containing a detergent, a surface active agent and a chelating agent containing a tetra sodium salt of ethylene diamine tetra acetic acid.

8. A tumbling process for bearings comprising the steps of removing lubricant from the bearings with a solvent; tumbling the bearings for at least 24 hours in an alkaline aqueous solution having a pH within the range of 12 to 14 and containing at least 5% of a chelating agent containing a tetra sodium salt of ethylene diamine tetra acetic acid, a surface active agent, a detergent and finely divided abrasive in suspension; rinsing the bearings in acid free water; tumbling the bearings for at least 24 hours in an aqueous solution having a pH within the range of 12 to 14 and containing at least 5% of a chelating agent containing a tetra sodium salt of ethylene diamine tetra acetic acid and detergent; tumbling the bearings in an aqueous dilution of the last mentioned tumbling solution; rinsing the bearings in acid free water; drying the bearings under hot air in dust free atmosphere and coating the bearings with a suitable light oil.

9. A tumbling process for bearings comprising the steps of removing lubricant from the bearings with a solvent; tumbling the bearings in aqueous alkaline solution having a pH of at least 12 and containing a detergent, powdered abrasive in suspension, and a stable chelating agent which chemically combines with ferrous metal ions present in materials adhering to bearings and which forms with these ions stable compounds that enter into and remain in solution, said chelating agent containing a tetra sodium salt of ethylene diamine tetra acetic acid; rinsing the bearings in acid free water; tumbling the bearings in a solution containing at least 5% of the same chelating agent by volume and a surface active agent; rinsing the bearings in acid free water; drying the bearings and coating them with a suitable lubricant.

10. A tumbling process for bearings comprising the steps of removing lubricant from the bearings with a solvent; tumbling the bearings for at least 4 hours in an alkaline aqueous solution having a pH of at least 12 and containing a maximum of 2% of a stable chelating agent containing a tetra sodium salt of ethylene diamine tetra acetic acid, finely divided abrasive in suspension, a detergent and a surface active agent; rinsing the bearings in acid free water; tumbling the bearings for at least 8 hours in an alkaline aqueous solution containing at least 5% of the same chelating agent, a detergent and a surface active agent; rinsing the bearings in acid free water; rapidly drying the bearings in a dust free atmosphere and coating the bearings with a suitable lubricant.

References Cited in the file of this patent

UNITED STATES PATENTS

| Number | Name | Date |
| --- | --- | --- |
| 2,412,943 | Bosworth | Dec. 24, 1946 |
| 2,540,003 | McCoy | Jan. 30, 1951 |
| 2,548,264 | Howe | Apr. 10, 1951 |